Dec. 25, 1962 H. ARNI ET AL 3,069,721
TOOLS FOR MAKING SURFACE PATTERNS
Filed March 3, 1961 2 Sheets-Sheet 1
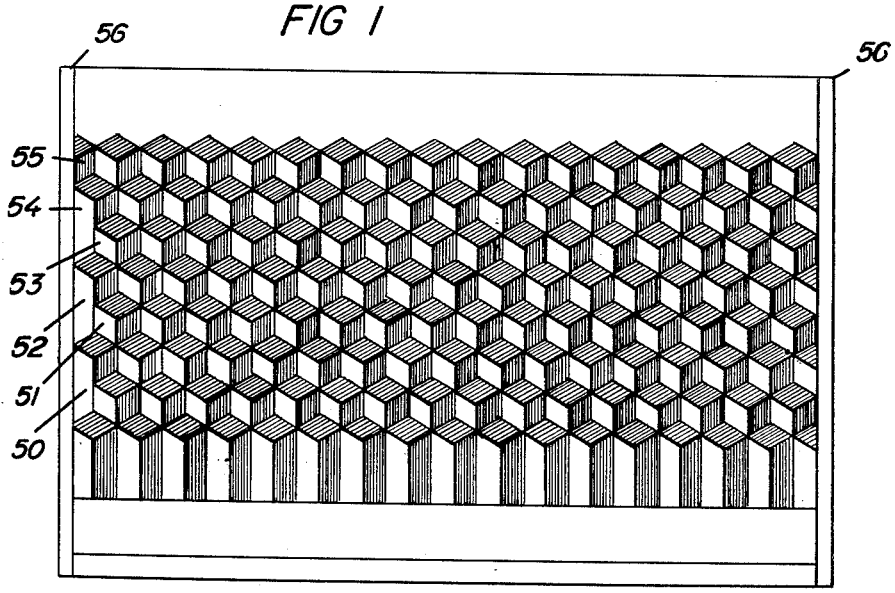
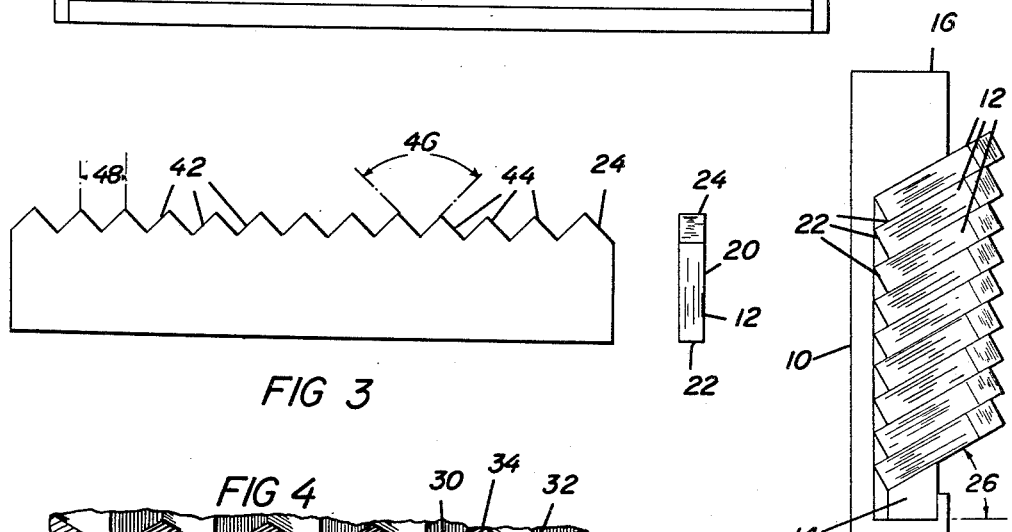
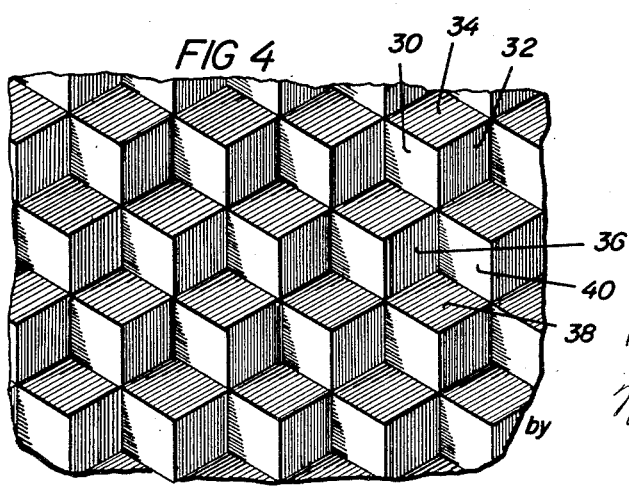
INVENTORS
HANS ARNI AND PETER JORDI
ATTORNEYS Dec. 25, 1962 H. ARNI ET AL 3,069,721
TOOLS FOR MAKING SURFACE PATTERNS
Filed March 3, 1961 2 Sheets-Sheet 2

INVENTORS
HANS ARNI and PETER JORDI by Werderoth, Lind & Ponack
ATTORNEYS

United States Patent Office 3,069,721
Patented Dec. 25, 1962

3,069,721
TOOLS FOR MAKING SURFACE PATTERNS
Hans Arni, Geneva, and Peter Jordi, Basel, Switzerland, assignors to Ciba Limited, Basel, Switzerland, a company of Switzerland
Filed Mar. 3, 1961, Ser. No. 93,161
Claims priority, application Switzerland Mar. 4, 1960
3 Claims. (Cl. 18—1)

The present invention relates to a tool for making surface patterns.

Surface patterns, for example, in the shape of rasters or grooves, are employed in many technical fields, either merely to decorate the surface of an object or to achieve certain optical effects. In the latter case, a surface raster, for example, achieves a directional reflection of incident light. Surfaces of that kind are, for example, employed as projection screens by which, owing to the directional reflection, particularly bright projection can be achieved or are employed as non-illuminated signals, for example, for traffic purposes. The latter are often also termed re-radiators. In order to achieve a uniform effect over the entire surface, the minute elements forming the surface pattern must be evenly distributed and be of identical size, because otherwise the surface produces a non-uniform or "cloudy" effect. This is particularly so when the pattern is employed as a reflecting surface which is expected to reflect incident light within a narrowly limited spatial angle.

Surfaces may be produced, for example, by stamping (embossing, goffering) a solid material or by casting (injection moulding, foil coating) a liquid substance which will set after casting. In all those manufacturing processes a tool is required, for example a stamping or moulding tool, which is shaped as the negative (die) of the surface to be produced.

According to the present invention a tool for making surface patterns has a plurality of juxtaposed elements having a sawtooth-like edge, these elements being arranged in such a way that their sawtooth-like edges form a regular surface pattern.

Figure 5:
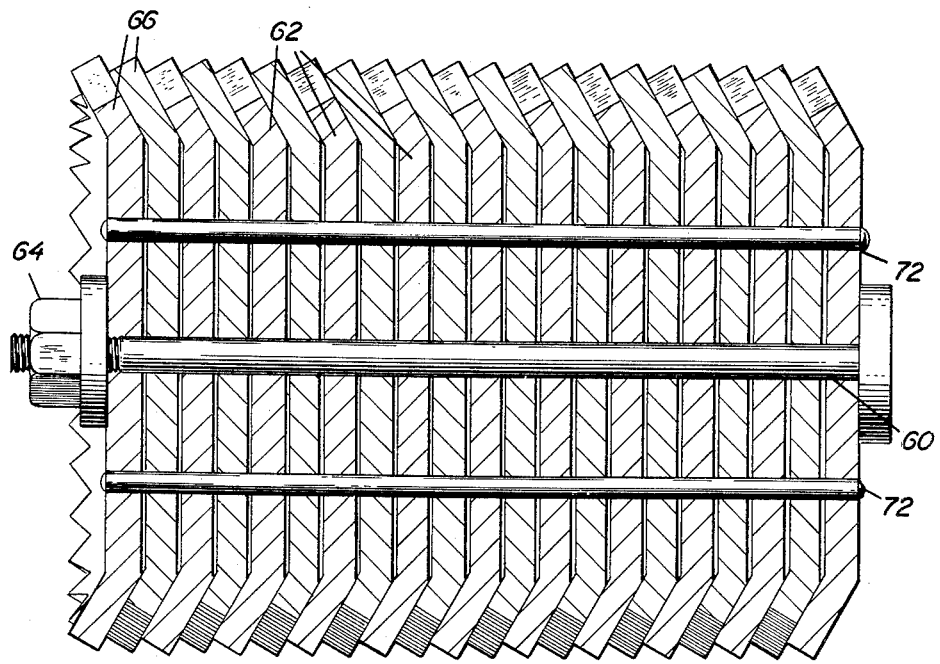
Figure 6:
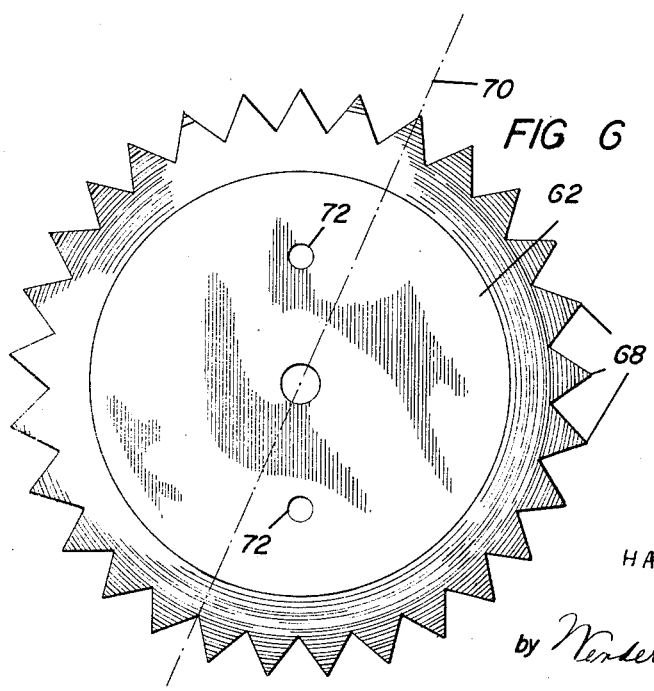

Embodiments of the present invention will now be described in further detail with reference to the accompanying drawings of which:

FIGS. 1 and 2 show the embodiment diagrammatically in plan and elevation respectively, FIG. 3 shows one of the strip-like elements from which the embodiment of FIG. 1 is composed, FIG. 4 is an enlarged view of a regular surface pattern produced with the embodiment of FIG. 1, FIG. 5 shows in section another embodiment, and, FIG. 6 shows one of the elements of which the embodiment of FIG. 5 is composed.

FIGS. 1 and 2 show in plan and elevation respectively a tool for making a flat surface pattern, the tool embodying the present invention. The tool comprises a support 10 and a large number of strip-like elements 12 clamped in this support. The elements are positioned in the support in such manner that the plane of each element is inclined relatively to the plane of the support, there being provided bearing faces 14 and 16 at the sides of the support to hold the elements in the required inclined positions.

The individual elements are shown in FIG. 3. Each element has two plane faces 20, one straight longitudinal face 22, and a second sawtooth-like longitudinal face 24. As shown in FIG. 2, the individual elements are supported with their straight longitudinal faces 22 against the support 10 and all of them are uniformly inclined at an identical fixed angle 26, relatively to the horizontal. As may be seen in FIG. 1, the sawtooth edges of all elements together form a regular surface pattern which can be used for the treatment of an object to be provided with a surface pattern.

The tool shown in FIGS. 1 and 2 is a "cubic" pattern. Such cubic patterns are frequently used particularly for the reflecting devices mentioned above. The patterned or grooved surfaces of reflecting devices are made in such a way that light impinging thereon is reflected practically without dispersion, parallel to the direction of incidence. The result is that, when viewed by an observer located in the vicinity of a given light source, for example the head lamps of a car, the surface is seen to light up brightly.

Re-radiating reflection surfaces of that kind are frequently used to signal traffic signs to passing vehicles. It was found that the cubic pattern is a particularly suitable surface pattern for those reflecting devices. This pattern is composed of a large number of cube portions, i.e. each element has three square surfaces, each perpendicular on the other, and all of them being reflecting surfaces. Thus, each single cubic portion is formed by three of the six surfaces of a cube. If a multitude of such cubic portions of identical size are juxtaposed in such a way that they are adjacent one another without intervening gaps, uniformly distributed and of the same size, then a regular cubic pattern is obtained.

FIG. 4 shows in an enlarged perspective view part of such a cubic pattern. Thus, for example, the three surfaces 30, 32 and 34 form the corner of a cube projecting out of the plane of the drawing, the shading having been applied so as to suggest that the light comes from the left. The cubes formed by these three surfaces are bordered on all sides by six cube portions of equal size which form the regular cubic pattern of FIG. 4.

It is also possible, however, to conceive the cubic pattern shown in FIG. 4 as being composed of elements formed by re-entrant cubic cavities, for example each element formed by the three surfaces 36, 38 and 40. These three inwardly recessed cube portions form a "triple mirror," an optical device which returns parallel to its own direction each light ray incident upon one of the three surfaces composing the triple mirror after it has been reflected three times. In their entirety, then, the elementary cubic portions or triple mirrors form a reflecting surface which has the above-mentioned property of reflecting incident light practically without dispersion and in a direction parallel to itself. Reflecting surfaces of this type are employed as re-radiating devices, but may also be employed for other purposes, for example as a backing layer for photographic or other pictures and pictorial displays of a kind explained in detail in the specification of copending patent application No. 63,616, filed October 19, 1960 in the name of Carlo Rossi et al. and assigned to Ciba Limited, Basel, Switzerland.

If such a regular cubic pattern is to be formed, the sawtooth-like longitudinal faces as well as the thickness of the elements employed must fulfil certain conditions. To achieve the purpose, first of all the longitudinal faces of the elements are made rectangular. This means that, as shown in FIG. 3, the adjacent faces 42 and 44 of the sawteeth always form an angle 46 of 90°. Furthermore, the pitch 48 of the toothing, i.e. the distance between adjacent teeth, should equal $\sqrt{2}$ times the thickness of each element. Also, the elements 12 juxtaposed on the supports 10 should be inclined at an angle 26 of 35°16′ (=arc tangent $1/\sqrt{2}$) relatively to the horizontal. Finally, each adjacent element should be laterally displaced, relatively to the other, by half a sawtooth division. If all these conditions are met, a regular cubic pattern can indeed be obtained.

The sawtooth faces of the elements, partly indicated in FIG. 1, are rectangular, i.e. adjacent sawtooth surfaces subtend an angle of 90°. All elements extend parallel with one another, are inclined relatively to the the support plane at an angle of 35°16′ and rest with their straight longitudinal face on the support plane. Since the pitch of the toothing equals $\sqrt{2}$ times the thickness of one element, and as a result of the inclination of each single element, the upper sawtooth faces of each element are situated at the same level as the re-entrant edges of adjacent elements. A uniform cubic pattern is achieved in that adjacent elements are always displaced laterally by half a sawtooth division. This can be seen clearly in FIG. 1. For example, all elements which are identical as regards their toothing such as 50, 52, 54 are shifted to the right, until they are stopped by the lateral bearing edge 56 of the support while the intervening elements 51, 53, 55 are shifted to the left. Therefore, if the width of the support between the edges 56 is made larger by half a toothing than the overall length of elements 12, then this alternating displacement to the right and to the left causes adjacent elements to be shifted each time by half a sawtooth division, and the cubic pattern shown in the center of FIG. 1 will result which is identical with the enlarged illustration of FIG. 4.

For a pattern of adequate regularity to be produced the accuracy of the individual elements must obviously be very great. This may be achieved, for example, by employing elements of plane-parallel metal strips having very smooth or even polished lateral surfaces. These elements are placed on one another with their polished lateral surfaces so that they form a flat block; then the two surfaces of the block which correspond to its longitudinal edges are ground so that elements are obtained which have longitudinal edges exactly perpendicular to the planes of the side faces. Then this packet is provided on one side with the sawtooth subdivision, for example by milling with a suitably shaped cutter. The individual saw edges may either be cut consecutively or simultaneously. The sawtooth grooves are preferably produced by means of a diamond cutter. In this way, not only great accuracy of the sawteeth, but also a very high surface quality can be obtained which is a condition for a properly reflecting re-radiation surface. Surfaces of this kind, produced with a diamond cutter, may be used for the tool without any after-treatment. If the sawtooth surfaces are produced by milling, however, the surface quality will have to be improved, for example by polishing.

A tool as shown in FIG. 1 and obtained in the manner just described may serve either as a tool, for example a stamping die or a coating support, or as a model for producing the actual working tool. This can be done by known reproducing techniques, for example by making a cast using a casting resin or some other plastic substance. At the same time it is possible, by multiplication of the surface formed from this tool, to produce a tool having a larger working surface. The area of a flat stamping tool is of course limited, and so is the area of surfaces produceable therefrom. If still larger surfaces are desired, it will be necessary either to execute a large number of consecutive stamping operations which has the disadvantage that certain directional deviations between successive stamping cycles are unavoidable, resulting in relative directional deviations between individual part-surfaces and thus in a non-uniform optical effect of the pattern as a whole.

On the other hand, if a tool such as proposed by the invention is made cylindrical, then webs of any length may receive a surface pattern.

In such an embossing cylinder, the individual elements are circular discs in whose periphery a sawtooth shape has been worked. All these elements are mounted on a common shaft in such a way that their sawtooth edges form a regular surface pattern on a cylinder surface. A sectional diagrammatic illustration of such a tool appears in FIG. 5.

Referring to FIG. 5, on a bolt 60 a large number of saucer-shaped cylindrical discs 62 are mounted and held together by a nut 64. The individual elements have rims 66, bent in the manner of a saucer, and these rims themselves have a sawtooth formation at their peripheries. This is shown in FIG. 6. Again, each periphery has rectangular, or substantially rectangular sawteeth 68 so as to produce a cubic pattern. If, as has already been mentioned, a cubic pattern is to be produced again, the peripheral edges should consist of rectangular sawteeth as shown in FIG. 6. The peripheral edges are bent in the manner of a saucer in such a way that the rim planes are inclined relatively to the disc plane at an angle of 35°16′. Furthermore, the pitch of the toothing amounts to $\sqrt{2}$ times the thickness of the disc element. It is also necessary to ensure that each element is rotationally displaced by half a sawtooth division relatively to the adjacent ones, in order thus to achieve the same effect as was already explained with respect to FIGS. 3 and 4. To this purpose the number of teeth provided over the periphery of one disc is an odd number, as becomes apparent from the drawing. If a diameter 70 is drawn through the peak of one tooth, it will, on the opposite side of the circumference, pass exactly through the re-entrant edge formed between two sawteeth. The discs are secured against rotation on the shaft by two pins 72 which should also be situated on a diameter of the cylinder.

The discs are made in a manner similar to that of the strip-like elements of the FIG. 3, i.e. the sawtooth is produced either by a diamond cutter or by milling a cylindrical pack composed of elements. Milling is followed by bending of the edges and then by threading, the latter operation being carried out in such a way that consecutive elements are always displaced by 180°. Thus, on a generatrix there will always be on the first element a sawtooth peak and on the following element a sawtooth trough, and so forth. In this way a cylindrical roller is obtained whose surface is covered by a regular cubic pattern.

It is of course possible to produce relatively displaced disc edges also by employing two different types of discs in which the position of the sawteeth relatively to a register pin is displaced by half a sawtooth division. In this case the pack forming the finished roller will be composed by alternately threading a disc of one type and then a disc of the other type. Here, too, a roller is obtained whose surface is covered by a regular cubic pattern.

The advantage of a tool such as that embodying the invention lies in the fact that all component surfaces of the pattern, and in particular the three surfaces forming a cubic pattern, can be machined with very great accuracy and thus attain a very high surface quality because all of them are easily accessible at least during certain stages of the manufacturing process. In the tool shown in FIG. 1 and composed of flat elements, two surfaces in a cube portion are formed by the surfaces of the sawtooth and the third surface by a lateral surface of the element. As already mentioned before, it is preferable to employ elements whose lateral faces have already a high surface quality before being machined, such as drawn surface materials or strips whose surfaces are ground plane-parallel and polished, if necessary, before receiving further treatment. The sawtooth surfaces can be produced with a high surface quality either by milling and subsequent polishing, or by a diamond cutter. The surface quality of these faces is not impaired during assembly so that it is indeed possible to attain a tool surface whose elementary faces have maximum surface quality. This cannot be achieved by other manufacturing processes used for such surfaces, for example by the stamping of single elements, knurling etc. because the surface elements on the finished tool are no longer accessible for a polishing operation, and particularly in view of the fact that the surface elements must not only have a high degree of polish, but also be plane and have a pre-determined surface orientation relatively to one another.

The present invention is of course not limited to the production of cubic patterns even though such cubic patterns represent a particularly advantageous case in which the possibilities of the tool and of the process for making such a tool can be developed to full advantage. But it will be easily understood that the sawtooth-like longitudinal edges of the elements may also be shaped in a different way; thus they may, for example, also be provided with a circular or otherwise arcuate division, the total result being again a uniform surface pattern composed of precisely defined individual elements. Such elements have edges referred herein as "sawtooth-like."

If the tool is to be used to produce uniform cubic patterns of the type shown in FIG. 4 from plastic material, for example by embossing foils, then the resilience of the material will produce a certain deviation of the shape assumed by the individual cube elements in the embossed raster when compared with that of the tool elements. Experience has shown that in a uniform cubic pattern the angle subtended by the individual edges should in no case be larger than 90° because then the reflection at three cube surfaces will no longer occur as a rule. This reflection mode is, however, necessary for adequate reflection in the direction of incident light, and if the above-mentioned angle is larger than 90°, then there will only be a reflection at two cube surfaces. Light which is thus reflected in the wrong direction will be lost and the luminous efficiency of the surface, i.e. the luminous density of the surface as it appears to an observer in the vicinity of the light source, for example the head lamps of a car, is impaired. If, on the other hand, the angles enclosed by the individual cube surfaces are smaller than 90°, the triple reflection of the incident light is ensured and the light will still be thrown back to an area near the observer, although a certain dispersion takes place. In order to ensure that, notwithstanding the deviation which occurs during stamping, the angles at the individual edges should in no case exceed the value of 90°, the sawtooth edges in the tool of the invention are chosen slightly smaller than 90°. The magnitude of this deviation depends upon the resilience and the embossing properties of the material to be worked and is usually of the order of approximately 5°.

Surfaces manufactured with the aid of this tool have optical qualities (directional reflection) which make them suitable for various purposes, for example for making supports for pictures to be viewed by reflected light as described in the specification of the afore-mentioned co-pending patent application No. 63,616 for embossing textiles or synthetic foils, or as effective surfaces of traffic signals. However, this enumeration should by no means be interpreted as limiting the applicability of the tool to any one of these fields.

What is claimed is:

1. A tool for making regular reflecting surface patterns composed of a large number of identical cube portions, said tool comprising a cylindrical bolt, a plurality of saucer-shaped cylindrical discs each having a central bore and being mounted on said cylindrical bolt, the peripheral edge of each of said discs having a sawtooth-like shape, the angles of said sawtooth elements being approximately equal to 90°, the plane of said edge being inclined to the plane of the discs at an angle of 35°16′, the pitch of the approximately rectangular sawtooth elements being $\sqrt{2}$ times the thickness of the disc edge, and adjacent disc elements being rotationally displaced by half a sawtooth division, whereby the external cylinder surface of the tool formed by the adjacent peripheral edges of the discs is a regular pattern composed of identical cube portions.

2. A tool as claimed in claim 1, in which said discs have an odd number of sawtooth elements and have two additional bores diametrally disposed with respect to said central bore, adjoining discs being rotationally displaced with regard to the adjacent disc at an angle of 180°.

3. A tool as claimed in claim 1 for making a regular surface, in which the angles of the sawtooth-like edges are slightly smaller than 90°.

References Cited in the file of this patent

UNITED STATES PATENTS

| 2,200,997 | Royle | May 14, 1940 |
| 2,315,721 | Martin | Apr. 6, 1943 |
| 2,689,092 | Clark | Sept. 14, 1954 |
| 2,968,838 | Hicks | Jan. 24, 1961 |

FOREIGN PATENTS

| 156,406 | Australia | July 16, 1953 |
| 156,617 | Australia | Dec. 4, 1952 |
| 494,480 | Great Britain | Oct. 26, 1938 |